US011025330B2

(12) United States Patent
Chen et al.

(10) Patent No.: US 11,025,330 B2
(45) Date of Patent: Jun. 1, 2021

(54) METHOD FOR INDICATING AND DETERMINING BEAM INFORMATION, DEVICE, AND COMMUNICATION SYSTEM

(71) Applicant: China Academy of Telecommunications Technology, Beijing (CN)

(72) Inventors: Shanzhi Chen, Beijing (CN); Shaohui Sun, Beijing (CN); Qiubin Gao, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 16/638,116

(22) PCT Filed: Jun. 27, 2018

(86) PCT No.: PCT/CN2018/093180
§ 371 (c)(1),
(2) Date: Feb. 10, 2020

(87) PCT Pub. No.: WO2019/029290
PCT Pub. Date: Feb. 14, 2019

(65) Prior Publication Data
US 2020/0177262 A1    Jun. 4, 2020

(30) Foreign Application Priority Data
Aug. 11, 2017 (CN) .......................... 201710686152.5

(51) Int. Cl.
H04B 7/06 (2006.01)
H04B 7/08 (2006.01)
(52) U.S. Cl.
CPC ........... *H04B 7/0695* (2013.01); *H04B 7/088* (2013.01)

(58) Field of Classification Search
CPC ............................. H04B 7/0695; H04B 7/088
(Continued)

(56) References Cited
U.S. PATENT DOCUMENTS

| 2019/0037495 | A1* | 1/2019 | Wilson et al. | ........ H04B 7/0695 |
| 2019/0074880 | A1* | 3/2019 | Frenne | ................ H04B 7/0626 |
| 2020/0195324 | A1* | 6/2020 | Grant | .................... H04W 24/10 |

FOREIGN PATENT DOCUMENTS

| CN | 104734761 A | 6/2015 |
| CN | 106961296 A | 7/2017 |

(Continued)

OTHER PUBLICATIONS

Huawei et al: "DL beam management", 3GPP Draft; RI-1708134, 3rd Generation Partnership Project (3GPP),May 15-19, 2017,pp. 7-8 ,vol. RAN WGI, No. Hangzhou, China;Mobile Competence Centre ; 650, Route Des Lucioles ; F-06921 Sophia-Antipolis Cedex ; France.
(Continued)

*Primary Examiner* — Ted M Wang
(74) *Attorney, Agent, or Firm* — Foley & Lardner LLP

(57) ABSTRACT

The present application is for use in reducing the overhead of transmitting beam information between a transmitting end and a receiving end. Disclosed are a method for indicating and determining beam information, a device, and a communication system. The method provided in the present application for indicating beam information comprises: a transmitting end determines a first transmission beam that needs to be used for transmission with a receiving end; the transmitting end determines, on the basis of first mapping relations between beam pair (BPL) identifiers and transmission beams, a first BPL identifier corresponding to the first transmission beam, where the receiving end is provided with second mapping relations between the BPL identifiers and reception beams; the transmitting end transmits the first BPL
(Continued)

identifier to the receiving end; and the transmitting end uses the first transmission beam to transmit a signal to the receiving end.

4 Claims, 4 Drawing Sheets

(58) Field of Classification Search
USPC .......................................................... 375/267
See application file for complete search history.

(56) References Cited

FOREIGN PATENT DOCUMENTS

| CN | 107852219 A | 3/2018 |
|----|---|---|
| JP | 2020-516129 A | 5/2020 |
| WO | WO 2015090061 A | 6/2015 |
| WO | WO-2018/173163 A1 | 9/2018 |
| WO | WO-2018/173239 A1 | 9/2018 |

OTHER PUBLICATIONS

Huawei et al: "General views on DL beam management", 3GPP Draft; RI-1711636, 3rd Generation Partnership Project (3GPP), Jun. 27-30, 2017, pp. 7-8; table 2,vol. RAN WGI, No. Qingdao, China; Mobile Competence Centre ; 650, Route Des Lucioles ; F-06921 Sophia-Antipolis Cedex ; France.
3GPP TSG RAN WGI Meeting #88b, R1-1704229, Mar. 25, 2017, titled "DL Beam Management", Hisilicon Huawei.

\* cited by examiner

METHOD FOR INDICATING AND DETERMINING BEAM INFORMATION, DEVICE, AND COMMUNICATION SYSTEM

The present application is a US National Stage of International Application No. PCT/CN2018/093180, filed on Jun. 27, 2018, which claims priority from Chinese Patent Application No. 201710686152.5 filed with the Chinese Patent Office on Aug. 11, 2017 and entitled "Method and Device for Indicating and Determining Beam Information, and Communication System", which is herein incorporated by reference in its entirety.

FIELD

The present application relates to the technical field of communication technologies, and in particular to a method and a device for indicating and determining beam information, and a communication system.

BACKGROUND

At present, in order to further improve the multiple input multiple output (MIMO) technology, a large-scale antenna technology is introduced into a mobile communication system. For a base station, a large-scale antenna array can have up to 512 or even 1024 antenna elements. When an all-digital antenna is used, each antenna oscillator is connected with a transceiver unit (TXRU), and at this time, there will be up to 512 or even 1024 TXRUs. For a terminal, an antenna array with up to 32/64 antenna oscillators can also be configured. Beamforming at both sides of the base station and the terminal can obtain huge beam-forming gain to compensate for signal attenuation caused by path loss. In particular, the path loss of high-band communication (e.g., on 30 GHz frequency point) is more serious than the path loss of low-band communication, which makes the coverage of wireless signals extremely limited. Through the beam-forming technology of large-scale antennas, the coverage area of wireless signals can be expanded to a practical range.

In order to further improve the performance of analog beamforming, there is also a transceiving solution of digital-analog hybrid beamforming, and the solution balances the flexibility of digital beamforming with low complexity of analog beamforming, and has the ability to support simultaneous forming of multiple data streams and multiple users, and meanwhile the complexity is also controlled within a reasonable range.

A transmitting end indicates beam information so that a receiving end can adjust a receiving beam to achieve a best receiving effect. However, in a system using a large-scale antenna array, the number of beams may reach 256, 1024 or more, and the indication of beam information requires 8 bits, 10 bits, or even more at a time. Therefore, the indication process of the beam information is expensive and inefficient.

SUMMARY

Embodiments of the present application provide a method and a device for indicating and determining beam information, and a communication system, so as to reduce the overhead of transmitting beam information between a transmitting end and a receiving end.

In a first aspect, the embodiments of the present application provide a method for indicating beam information, which includes:

determining by a transmitting end a first transmitting beam to be used for transmission with a receiving end;

determining by the transmitting end, on the basis of a first mapping relationship between beam pair link (BPL) identifiers and transmitting beams, a first BPL identifier corresponding to the first transmitting beam, where the receiving end is provided with a second mapping relationship between the BPL identifiers and receiving beams;

transmitting the first BPL identifier to the receiving end by the transmitting end; and transmitting by the transmitting end a signal to the receiving end by using the first transmitting beam.

For the above-mentioned method for indicating beam information provided by the embodiments of the present application, by building the first mapping relationship between the BPL identifiers and the transmitting beams at the transmitting end, and correspondingly building the second mapping relationship between the BPL identifiers and the receiving beams at the receiving end, the indication of the beam information only needs to be used to indicate the BPL identifiers, so that the receiving end can determine the corresponding receiving beams according to the BPL identifiers, thereby reducing the system overhead during the process of indicating beam information.

Optionally, for the above-mentioned method for indicating beam information provided by the embodiments of the present application, the first mapping relationship specifically comprises a mapping relationship among the BPL identifiers, Channel state Information-Reference Signal Resource Indicators (CRIs), and the transmission beams; and the second mapping relationship specifically comprises a mapping relationship among the BPL identifiers, the CRIs and the receiving beams.

Optionally, for the above-mentioned method for indicating beam information provided by the embodiments of the present application, the transmitting end determines the first mapping relationship by the following method:

configuring by the transmitting end reference signal resources for the receiving end;

transmitting by the transmitting end a reference signal within the reference signal resources to the receiving end, so that the receiving end performs measurement and reporting for the reference signal; and determining by the transmitting end the first mapping relationship from measurement reporting results reported by the receiving end.

Optionally, for the above-mentioned method for indicating beam information provided by the embodiments of the present application, the method further includes:

transmitting by the transmitting end a mapping relationship between the BPL identifiers and the CRIs to the receiving end.

In a second aspect, the embodiments of the present application provide a method for determining beam information, which includes:

receiving by a receiving end a first beam pair link (BPL) identifier indicated by a transmitting end;

determining by the receiving end, on the basis of a second mapping relationship between BPL identifiers and receiving beams, a first receiving beam corresponding to the first BPL identifier, where the transmitting end is provided with a first mapping relationship between BPL identifiers and transmitting beams; and receiving by the receiving end a signal transmitted by the transmitting end by using the first receiving beam.

Optionally, for the above-mentioned method for determining beam information provided by the embodiments of the present application, the first mapping relationship specifically comprises a mapping relationship among the BPL identifiers, Channel State Information-Reference Signal Resource Indicators (CRIs), and the transmitting beams;

the second mapping relationship specifically comprises a mapping relationship among the BPL identifiers, CRIs and the receiving beams.

Optionally, for the above-mentioned method for determining beam information provided by the embodiments of the present application, the method further includes:

receiving by the receiving end a mapping relationship between the BPL identifiers and the CRIs transmitted by the transmitting end.

Optionally, for the above-mentioned method for determining beam information provided by the embodiments of the present application, the receiving end determines the second mapping relationship by the following method:

receiving by the receiving end configuration information of reference signal resources transmitted by the transmitting end;

receiving by the receiving end a reference signal transmitted by the transmitting end within the reference signal resources, determining a receiving beam corresponding to each reference signal resource, and determining a mapping relationship between CRIs and receiving beams; and determining by the receiving end, on the basis of the mapping relationship between the CRIs and the receiving beams and the mapping relationship between the BPL identifiers and the CRIs, the second mapping relationship.

In a third aspect, the embodiments of the present application provide a device for indicating beam information, which includes:

a first unit for determining a first transmitting beam to be used for transmission with a receiving end;

a second unit for determining, on the basis of a first mapping relationship between beam pair link (BPL) identifiers and transmitting beams, a first BPL identifier corresponding to the first transmitting beam; where the receiving end is provided with a second mapping relationship between BPL identifiers and receiving beams;

a third unit for transmitting the first BPL identifier to the receiving end; and a fourth unit for transmitting a signal to the receiving end by using the first transmitting beam.

Optionally, for the above-mentioned device provided by the embodiments of the present application, the first mapping relationship specifically includes mapping relationship among the BPL identifiers, Channel State Information-Reference Signal Resource Indicators (CRIs), and the transmitting beams; and the second mapping relationship specifically includes a mapping relationship among the BPL identifiers, CRIs and the receiving beams.

Optionally, for the above-mentioned device provided by the embodiments of the present application, the second unit determines the first mapping relationship by following method:

configuring reference signal resources for the receiving end;

transmitting a reference signal within the reference signal resources to the receiving end, so that the receiving end performs measurement and reporting for the reference signal; and determining the first mapping relationship from measurement reporting results reported by the receiving end.

Optionally, for the above-mentioned device provided by the embodiments of the present application, the third unit is further used for:

transmitting a mapping relationship between the BPL identifiers and the CRIs to the receiving end.

In a fourth aspect, the embodiments of the present application provide a device for determining beam information, which includes:

a fifth unit for receiving a first beam pair link (BPL) identifier indicated by a transmitting end;

a sixth unit for determining, on the basis of a second mapping relationship between BPL identifiers and receiving beams, a first receiving beam corresponding to the first BPL identifier, where the transmitting end is provided with a first mapping relationship between BPL identifiers and transmitting beams; and a seventh unit for receiving a signal transmitted by the transmitting end by using the first receiving beam.

Optionally, for the above-mentioned device provided by the embodiments of the present application, the first mapping relationship specifically includes a mapping relationship among the BPL identifiers, Channel State Information-Reference Signal Resource Indicators (CRIs), and the transmitting beams;

the second mapping relationship specifically comprises a mapping relationship among the BPL identifiers, CRIs and the receiving beams.

Optionally, for the above-mentioned device provided by the embodiments of the present application, the sixth unit is further used for:

receiving a mapping relationship between the BPL identifiers and the CRIs transmitted by the transmitting end.

Optionally, for the above-mentioned device provided by the embodiments of the present application, the sixth unit determines the second mapping relationship by the following method:

receiving configuration information of reference signal resources transmitted by the transmitting end;

receiving a reference signal transmitted by the transmitting end within the reference signal resources, determining a receiving beam corresponding to each reference signal resource, and determining a mapping relationship between CRIs and receiving beams; and determining, on the basis of the mapping relationship between the CRIs and the receiving beams and the mapping relationship between the BPL identifiers and the CRIs, the second mapping relationship.

In a fifth aspect, the embodiments of the present application provide a communication system, which includes the above-mentioned device for indicating beam information provided by the embodiments of the present application, and/or the above-mentioned device for determining beam information provided by the embodiments of the present application.

In a sixth aspect, the embodiments of the present application provide a device for indicating beam information, which includes:

a memory for storing program instructions; and a processor for calling program instructions stored in the memory and executing any one of the above-mentioned methods for indicating beam information according to an obtained program.

In a seventh aspect, the embodiments of the present application provide a device for determining beam information, which includes:
a memory for storing program instructions; and
a processor for calling program instructions stored in the memory and executing any one of the above-mentioned methods for determining beam information according to an obtained program.

In an eighth aspect, the embodiments of the present invention provide a computer storage medium that stores computer-executable instructions for causing a computer to perform any one of the above-mentioned methods for indicating beam information or any one of the above-mentioned methods for determining beam information.

DETAILED DESCRIPTION OF THE EMBODIMENTS

Figure 1:
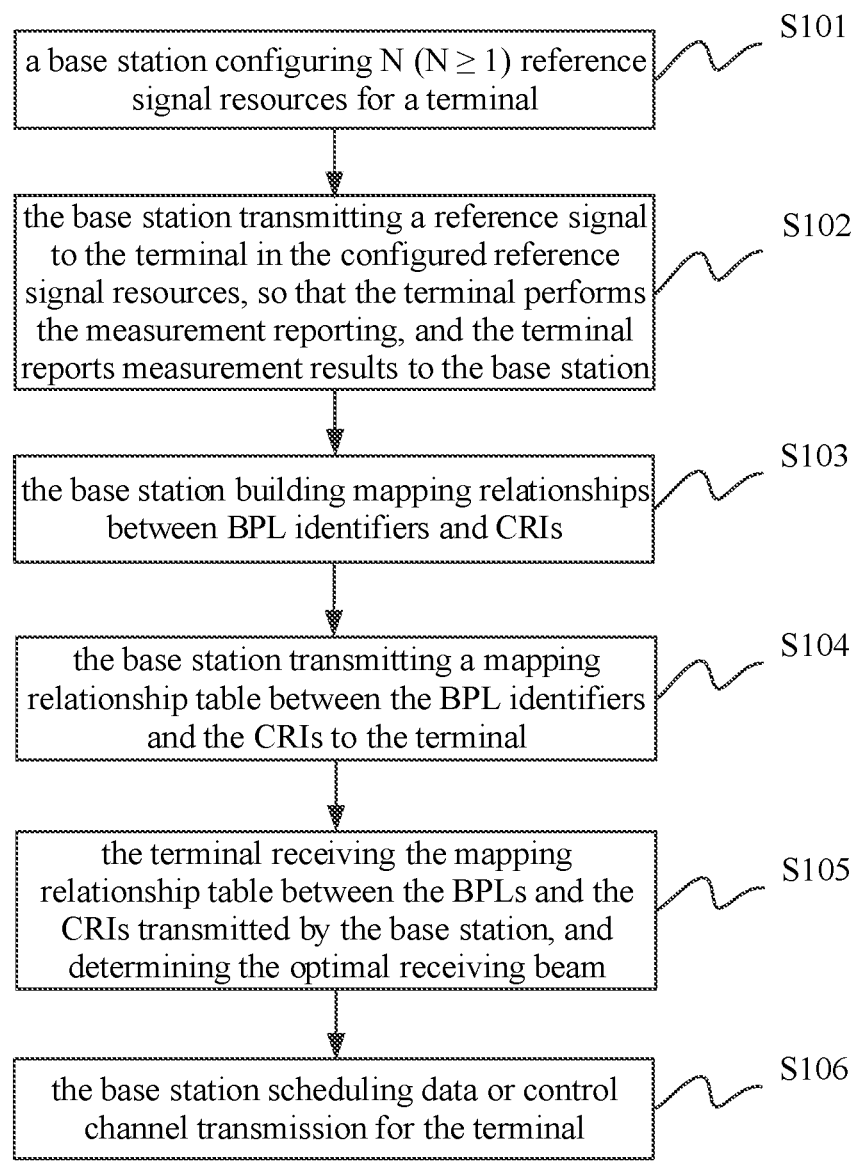
FIG. 1 is a flow schematic diagram of a method for processing (including indicating and determining) beam information provided by embodiments of the present application.

In order to make the objective, technical solution and advantages of the present application clearer, the present application will be described further in detail below in combination with the accompanying drawings. Obviously, the described embodiments are only parts of embodiments, rather than all embodiments of the present application. Based on the embodiments in the present application, all other embodiments obtained by those ordinarily skilled in the art without creative labor are within the claimed scope of the present application.

Before data transmission, in order to enable a receiving end to reasonably set a receiving beam, a transmitting end needs to notify the receiving end of information relevant to a transmitting beam of a data channel or control channel (a demodulation reference signal (DMRS) of the data or control channel). One notification method is to transfer Quasi-co-located (QCL) assumption to the receiving end, i.e., indicating the receiving end which reference signal ports are QCL with a DMRS port of the data or control channel of the receiving end with respect to spatial parameters (mean value of space arrival angles, expansion of space arrival angles, mean value of space start angle, or expansion of space start angle, etc.). If two signals are QCL with respect to one spatial parameter, the spatial parameter of the other signal can be inferred from the spatial parameter of one signal (for example, the spatial parameters of the two signals are the same). If the transmitting end notifies the receiving end which reference signal port(s) is (are) QCL with the DMRS of the data or control channel of the receiving end with respect to the spatial parameters, the receiving end can estimate the spatial parameters based on the reference signal port(s), determine receiving beams, and receive data or control signals by using the receiving beams.

In the embodiments of the present application, the reference signal being a Channel State Information-Reference Signal (CSI-RS) is taken as an example, that is, the transmitting end notifies the receiving end which reference signal transmitted by CSI-RS resources is QCL with the DMRS of the data or control channel with respect to the spatial parameters. For example, a base station (a transmitting end) configures N CSI-RS resources for a terminal (a receiving end), and a signal of each CSI-RS resource is transmitted through one beam. The terminal measures the N CSI-RS resources, selects Q CSI-RS resources with best quality, and feeds back identifiers and quality indexes of the Q CSI-RS resources to the base station. The quality index may be Reference Signal Receiving Power (RSRP), or Reference Signal Receiving Quality (RSRQ), etc. The base station receives information fed back by the terminal, and hereby determines a transmitting beam for transmission, thereby determining the CSI-RS resources of the DMRS QCL of the data or control channel. The base station transmits a CSI-RS Resource Indicator (CRI) to the terminal, so that the terminal can set an appropriate receiving beam.

In a system using a large-scale antenna array, the number of beams may reach 256, 1024 or more, and an indication of beam information requires 8 bits, 10 bits, or even more at a time, so that the embodiments of the present application provide a method for indicating beam information to reduce the system overhead caused by indicating beam information.

Taking a transmitting end as a base station and a receiving end as a terminal (UE) as an example, a method for processing beam information between the transmitting end and the receiving end provided by the embodiments of the present application, as shown in FIG. 1, specifically includes the following steps:

Step S101: the base station configuring N (N≥1) reference signal resources for the terminal.

One reference signal resource includes several time-frequency resources, e.g., including several Resource Elements (REs) within one orthogonal frequency division multiplexing (OFDM) symbol. The reference signal resource can occur repeatedly in a time domain, e.g., repeatedly occurring at a certain period, or occurring for multiple times in one period.

Step S102: the base station transmitting a reference signal to the terminal in the configured reference signal resources, so that the terminal performs the measurement reporting, and the terminal reports measurement results to the base station.

On a Base Station Side:
Reference signals of P (P≥1) antenna ports can be mapped in each reference signal resource. Reference signals transmitted from different reference signal resources can be transmitted by using different downlink transmitting beams. Assuming that the base station has a total of $N_T^{BS}$ candidate downlink transmitting beams, each downlink beam corresponds to a group of beamforming weights, and the transmission beamforming weight of the $n^{th}$ beam is $W_n=[w_1^n \ w_2^n \ \ldots \ w_K^n]^T$ where K is the number of antenna units for beamforming, and can be smaller than the number of the base station. For example, when one downlink beam is transmitted from only K antenna units connected to one transceiver unit, the number K of the antenna units for beamforming is smaller than the number of antenna units of the base station.

The base station selects one reference signal resource for each candidate downlink transmitting beam to transmit a corresponding downlink reference signal. For example, for $N_T^{BS}$ downlink transmitting beams, the base station can configure $N_T^{BS}$ reference signal resources, and the reference signal of each beam is mapped to one reference signal resource to be transmitted.

For example, when the base station has 256 downlink transmitting beams, the base station configures 256 reference signal resources, and the reference signal of each beam is mapped to one reference signal resource to be transmitted. The reference signal of each downlink transmitting beam is transmitted on the reference signal resource to which the reference signal is mapped after subjected to beamforming by using a beamforming weight corresponding to the beam.

Optionally, during specific implementation, in the above-mentioned method for indicating beam information provided by the embodiments of the present application, the above-mentioned N reference signal resources are periodic or semi-persistent resources, that is, the reference signals are periodically transmitted or semi-continuously transmitted.

On a Terminal Side:
the terminal receives the reference signals transmitted by the base station and determines the receiving beam corresponding to each reference signal resource. The receiving beam of the terminal may be selected from candidate receiving beams. The terminal has a total of $N_R^{UE}$ receiving beams, each receiving beam corresponds to a group of beamforming weights, and the beamforming weight of the $n^{th}$ beam is $V_n=[v_1^n \ v_2^n \ \ldots \ v_L^n]^T$ where L is the number of antenna oscillators for beamforming, and L can be smaller than the number of antenna oscillators of the terminal. For reference signal on one CSI-RS resource, the terminal can try to receive it by using each receiving beam respectively, and select the receiving beam with highest receiving signal power as the receiving beam of the CSI-RS resources respectively.

Optionally, during specific implementation, the terminal stores the receiving beam corresponding to each CSI-RS resource, and of course, the terminal may also store the receiving beams corresponding to a part of CSI-RS resources, and it is not limited here. Here, the terminal may store the mapping relationship between CSI-RS Resource Indicators (CRIs) and the receiving beams.

Optionally, during specific implementation, in the above-mentioned method for indicating beam information provided by the embodiments of the present application, the base station may also configure the CSI-RS resources for the terminal by means of resource collection. For example, the base station configures S CSI-RS resource sets for the terminal. The $s^{th}$ resource set contains $N_s$ CSI-RS resources. In this way, there are multiple manners for identifying the CSI-RS resources, which are illustrated by way of examples hereafter.

Manner I:
resource setting index+CSI-RS resource index: the CSI-RS resource index here refers to the serial number of the CSI-RS resources in one set; and each CSI-RS resource is uniquely determined by two indexes, namely the Resource Setting Index (RSI) and the CSI-RS Resource Index (i.e., CRI).

Manner II:
the CSI-RS resource index: the CSI-RS resources in all CSI-RS resource sets are indexed uniformly.

Regardless of the adopted configuration and identification method, CRI is used for representing the index of the CSI-RS resources in the subsequent description of the embodiments of the present application. If the manner of the resource setting index+CSI-RS resource index is adopted, the CRI can be replaced by (RSI, CRI).

Step S103: the base station building mapping relationships between beam pair link (BPL) identifiers and the CRIs.

The mapping relationships between the BPL identifiers and the CRIs define the mapping relationships between the BPL identifiers and the CRIs. The number of the BPL identifiers may be a preset value, or may be determined by the base station itself. If the number of the BPL identifiers is determined by the base station, the base station needs to notify the terminal of the number through signaling. Generally, the number of the BPL identifiers is much smaller than the number of the downlink transmitting beams. For example, when there are 256 downlink transmitting beams, the number of the BPL identifiers is 4 or 8.

The CRIs to which the BPL identifiers are mapped can be determined by the base station through the measurement reported by the terminal, and the base station establishes a mapping table according to measurement results reported by the terminal.

Each BPL identifier in the mapping table is mapped to one CSI-RS resource (represented by CRI). Since different CSI-RS resources are transmitted through different downlink transmitting beams, different BPL identifiers represent different downlink transmitting beams.

In one example of BPL mapping as shown in Table 1 below, the number of the BPL identifiers in Table 1 is 2, a BPL identifier '0' is mapped to CRI0, which corresponds to a transmitting beam (Tx beam) 0; and a BPL identifier '1' is mapped to CRI1, which corresponds to Tx beam 1.

TABLE 1

| BPL identifier | CRI | Transmitting beam (stored by the base station) |
|---|---|---|
| 0 | CRI0 | Tx Beam 0 |
| 1 | CRI1 | Tx Beam 1 |

During specific implementation, in the method for indicating beam information provided by the embodiments of the present application, the terminal receives the downlink reference signals transmitted by the base station and selects Q reference signal resources.

The following exemplifies the manner in which the terminal selects the reference signal resources transmitted by the base station.

After receiving the reference signal resources transmitted by the base station, the terminal measures the receiving signal of each reference signal resource, calculates the quality of the receiving signal, and selects Q reference signal resources with highest receiving quality, i.e., the first Q reference information resources after the reference information resources are ranked from high to low according to the receiving quality, where the indicator of the receiving quality can be RSRP, or RSRQ, etc.

Optionally, during specific implementation, the value of Q can be determined by the base station and notified to the terminal, or determined by the terminal itself, which is not limited here. For example, the terminal can determine the value of Q according to the number of independent instances whose receiving signal quality is greater than a certain threshold value.

The terminal feeds back the identifiers of Q reference signal resources to the base station.

For example, when N=256 (N is the number of CSI-RS resources transmitted by the base station) and Q=2 (Q is the number of CSI-RS resources selected by the terminal), the terminal reports the identifiers, CRIs and corresponding RSRPs of the two CSI-RS resources selected by the terminal, as shown in Table 2 below:

TABLE 2

| CRI | RSRP |
| --- | --- |
| 24 | −80 dBm |
| 37 | −78 dBm |

After receiving information reported by the terminal, the base station establishes a BPL mapping table as shown in Table 3 below (assuming that the index of CRI is x, and the index of the transmitting beams of the corresponding base station is also x):

TABLE 3

| BPL identifier | CRI | Index of transmitting beam (stored by the base station) |
| --- | --- | --- |
| 0 | 24 | 24 |
| 1 | 37 | 37 |

The above-mentioned base station establishes the BPL mapping table with reference to the information reported by the terminal, which means that the base station can establish the BPL mapping table not completely according to the information reported by the terminal. For example, under the condition that the terminal still reports according to the contents shown in Table 2, the base station can establish a table of the mapping relationship among the BPLs, the CRIs and the transmitting beams as shown in Table 3-1 below based on its own considerations, for example the needs of multi-user pairing, and the like reasons.

TABLE 3-1

| BPL identifier | CRI | Index of transmitting beam (stored by the base station) |
| --- | --- | --- |
| 0 | 24 | 24 |
| 1 | 47 | 47 |

Step S104: the base station transmitting the mapping relationship table between the BPL identifiers and the CRIs to the terminal.

For example, Table 4 below corresponding to the step S103 is transmitted to the terminal (the index information of the transmitting beams is only stored to the base station side, and may not be transmitted to the terminal):

TABLE 4

| BPL identifier | CRI |
| --- | --- |
| 0 | 24 |
| 1 | 37 |

Optionally, during the specific implementation, in the method for indicating beam information provided by the embodiments of the present application, the above-mentioned mapping relationship table between the BPL identifiers and the CRIs can be transmitted to the terminal by the base station through high-level signaling, where the high-level signaling can be, for example, Radio Resource Control (RRC) signaling or Media Access Control (MAC) layer signaling.

Step S105: the terminal receiving the mapping relationship table between the BPLs and the CRIs transmitted by the base station, and determining an optimal receiving beam.

The terminal determines a mapping relationship between the BPL identifiers and the receiving beams according to a stored mapping relationship between the CRIs and the receiving beams.

For example, a mapping relationship table shown in Table 5 is established. Assuming that the terminal has a total of 8 receiving beams, an optimal receiving beam for receiving the CSI-RS resource 24 is the receiving beam 4, and a best receiving beam for receiving the CSI-RS resource 37 is the receiving beam 7, then the terminal establishes the mapping relationship shown in Table 5 below. The mapping relationship between the BPL identifiers and the CRIs are obtained by the terminal from the base station.

TABLE 5

| BPL identifier | CRI | Index of receiving beam (stored by the terminal) |
| --- | --- | --- |
| 0 | 24 | 4 |
| 1 | 37 | 7 |

Step S106: the base station scheduling data or control channel transmission for the terminal.

The base station determines the transmitting beam used for transmission, and determines the BPL identifier corresponding to the transmitting beam through the mapping relationship between the BPL identifiers and the transmitting beams that are stored to the base station side. For example, as shown in Table 3, when the base station determines to transmit data to the terminal by using a transmitting beam 24, the BPL identifier corresponding to the transmitting beam 24 is '0'.

The base station carries BPL identifier information in the control information transmitted to the terminal, for example in downlink control signaling. For example in the above-mentioned example, the value of the BPL identifier information is '0'.

The number of bits occupied by the BPL identifier information is determined by the number of BPLs in the mapping relationship between the BPL identifiers and the CRI. For example, if the number of the BPL identifiers is 2, a BPL identifier information domain occupies 1 bit; and also for example, if the number of the BPL identifiers is 4, the BPL identifier information domain occupies 2 bits.

The terminal receives the BPL identifier information in control information transmitted by the base station, and determines to receive data transmitted by the base station or the receiving beam that should be used by the control channel by retrieving the stored mapping relationships between the BPL identifiers and the receiving beams. For example, in the above-mentioned example, the value of the BPL identifier information is '0', and then the terminal determines to use the receiving beam 4 for reception by searching Table 5.

Through the above-mentioned manner, in the method for indicating beam information provided by the present application, by establishing the mapping relationship between the BPLs and the CRIs, the resources occupied during the process of indicating beam information is limited, so that the system overhead of the process of indicating beam information is reduced.

Optionally, during specific implementation, in the above-mentioned method for indicating beam information provided by the embodiments of the present application, in the step S103, the base station can also establish the mapping relationships between the BPL identifiers and the CRIs not according to the measurement results reported by the terminal. That is, even if there is a report from the terminal, the base station can also select a CRI mapped to the BPL identifier, without being limited by the CRI selected and reported by the terminal. For example, in the above-mentioned example, the terminal selects and reports CRI 24 and CRI 37, but in order to better support multi-user transmission, the base station can establish the mapping relationships shown in Table 3-1 above.

Therefore, the above-mentioned steps S101 and S102 are not steps that are necessary to be performed.

Optionally, in the above-mentioned method for indicating beam information provided by the embodiments of the present application, the base station can decide to update the mapping relationships between the BPL identifiers and the CRIs. For example, when the terminal reports the latest CRI information, the base station can hereby update the mapping relationships between the BPL identifiers and the CRIs. After the mapping relationships between the BPL identifiers and the CRIs are updated, the base station needs to transmit the updated mapping relationships between the BPL identifiers and the CRIs to the terminal.

Optionally, during the specific implementation, in the above-mentioned method for indicating beam information provided by the embodiments of the present application, the mapping relationships between the BPL identifiers and the CRIs can be updated in a variety of manners, which will be described below by way of examples.

Manner I: completely updating. The mapping relationships of the BPL identifiers in the mapping relationships between the BPL identifiers and the CRIs are updated, that is, the entire mapping table is updated. After the mapping relationships are updated, the base station transmits a new table to the terminal. For example, the entire Table 4 is updated, and the updated Table 4 is transmitted to the terminal.

Manner II: partially updating. In the mapping relationships between the BPL identifiers and the CRIs, only a part of mapping relationships of the BPL identifiers need to be updated, then the base station can only transmit the updated mapping relationships of the BPL identifiers to the terminal. For BPL identifiers not included in updating messages, the base station and the terminal still assume that the previous mapping relationship exists. For example, if only the mapping relationship (BPL 0 corresponding to CRI 24) of the first row of Table 4 is updated, only the updated mapping relationship of the first row is transmitted, and it is defaulted that the mapping relationship (BPL 1 corresponding to CRI 37) of the second row remains unchanged.

Optionally, during the specific implementation, in the above-mentioned method for indicating beam information provided by the embodiments of the present application, after the mapping relationships between the BPL identifiers and the CRIs are transmitted to the terminal, the base station can change the transmitting beams mapped to the BPL identifiers, and can normally receive the changed transmitting beams as long as the terminal does not need to change the receiving beams. In this case, the mapping relationships between the BPL identifiers and the CRIs are not updated, that is, the base station does not need to transmit an updating message to the terminal. Correspondingly, after the terminal receives the mapping relationships between the BPL identifiers and the CRIs, the terminal can also change the receiving beams mapped to the BPL identifiers.

Optionally, during the specific implementation, in the above-mentioned method for indicating beam information provided by the embodiments of the present application, the transmitting and receiving relationship between the base station and the terminal can be interchanged, which is not limited here. In the above-mentioned example, the base station is the transmitting end, and the terminal is the receiving end.

Figure 2:
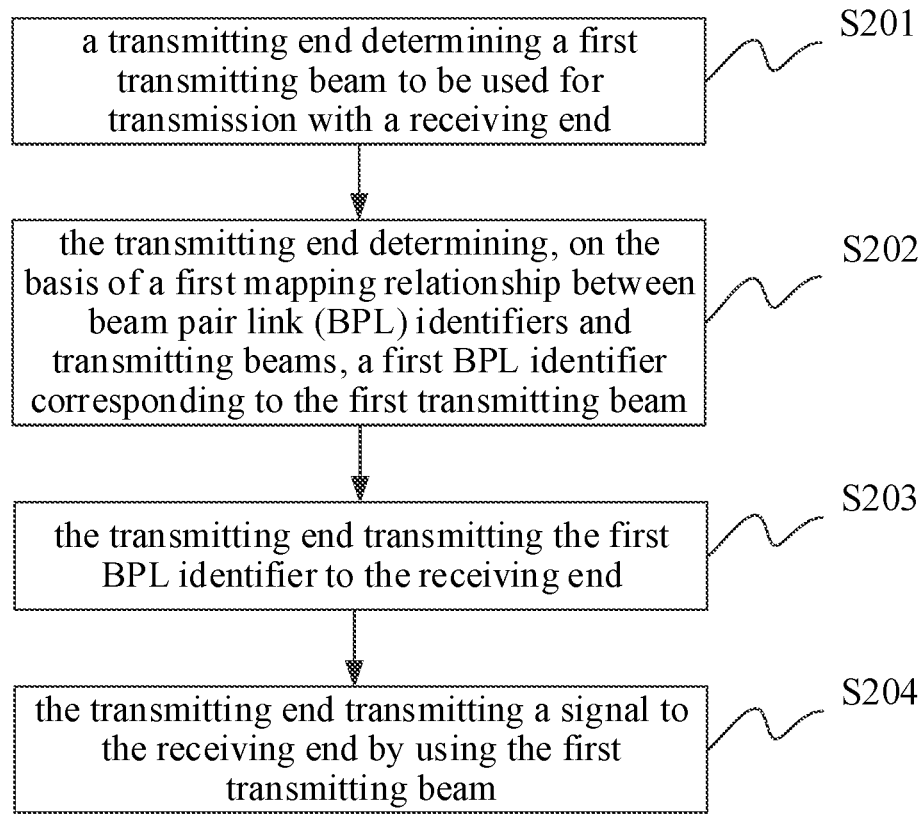
FIG. 2 is a flow schematic diagram of a method for indicating beam information provided by embodiments of the present application.

In conclusion, as shown in FIG. 2, at a transmitting end, a method for indicating beam information provided by the embodiments of the present application includes the following steps.

Step S201: the transmitting end determining a first transmitting beam to be used for transmission with a receiving end.

For the sake of clear expression and distinguishing from the transmitting beams mentioned in other descriptions, the transmitting beam to be used for data or signaling transmission between the transmitting end and the receiving end is referred to herein as the first transmitting beam. Correspondingly, on a receiving end side, it is in the same way.

Step S202: the transmitting end determining, on the basis of a first mapping relationship between beam pair link (BPL) identifiers and transmitting beams, a first BPL identifier corresponding to the first transmitting beam, where the receiving end is provided with a second mapping relationship between the BPL identifiers and receiving beams.

Step S203: the transmitting end transmitting the first BPL identifier to the receiving end.

For the sake of clear expression and distinguishing from the BPL identifiers mentioned in other descriptions, the BPL identifier transmitted to the receiving end by the transmitting end is referred to herein as the first BPL identifier. Correspondingly, on the receiving end side, it is in the same way.

Step S204: the transmitting end transmitting a signal to the receiving end by using the first transmitting beam.

Optionally, during the specific implementation, in the above-mentioned method for indicating beam information provided by the embodiments of the present application, the mapping relationship among the BPL identifiers, CRIs and the transmitting beams built by a base station side may be referred to as the first mapping relationship, such as the mapping relationship shown in Table 1 above.

Optionally, during specific implementation, in the above-mentioned method for indicating beam information provided by the embodiments of the present application, the mapping relationship among the BPL identifiers, the CRIs and the transmitting beams built by a terminal side may be referred to as the second mapping relationship, such as the mapping relationship shown in Table 5 above.

Optionally, for the above-mentioned method for indicating beam information provided by the embodiments of the present application, the first mapping relationship specifically comprises a mapping relationship among the BPL identifiers, Channel State Information-Reference Signal Resource Indicators (CRIs), and the transmitting beams;

the second mapping relationship specifically comprises a mapping relationship among the BPL identifiers, the CRIs and the receiving beams.

Optionally, for the above-mentioned method for indicating beam information provided by the embodiments of the present application, the transmitting end determines the first mapping relationship by the following manner:

configuring by the transmitting end reference signal resources for the receiving end;

transmitting by the transmitting end a reference signal within the reference signal resources to the receiving end, so that the receiving end performs measurement and reporting for the reference signal; and determining by the transmitting end the first mapping relationship from measurement reporting results reported by the receiving end.

Optionally, during specific implementation, in the above-mentioned method for indicating beam information provided by the embodiments of the present application, the measurement result is identifiers of x reference signal resources selected by a terminal according to the quality of the reference signal resources transmitted by a base station, and x can be set as required, for example, x can be the measurement results shown in Table 2 above.

Optionally, the above-mentioned method for indicating beam information provided by the embodiments of the present application further includes that:

the transmitting end transmits the mapping relationship between the BPL identifiers and the CRIs (e.g., the mapping relationship shown in Table 4 above) to the receiving end. Subsequently, if updating of the mapping relationship is involved, the transmitting end may also transmit the updated mapping relationship between the BPL identifiers and the CRIs to the receiving end.

Figure 3:
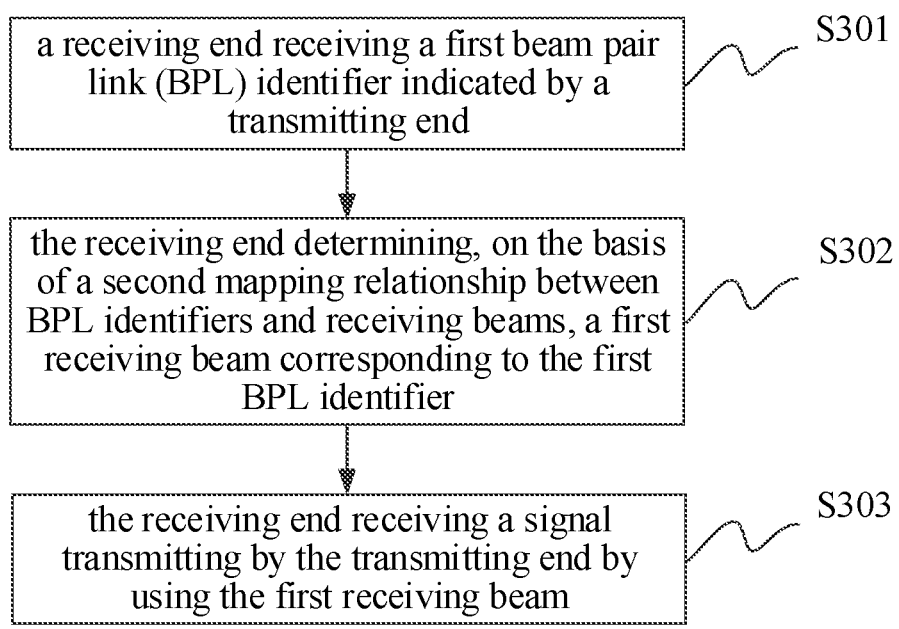
FIG. 3 is a flow schematic diagram of a method for determining beam information provided by embodiments of the present application.

Correspondingly, as shown in FIG. 3, at a receiving end, the present application also provides a method for determining beam information, which includes the following steps.

Step S301: a receiving end receiving a first beam pair link (BPL) identifier indicated by a transmitting end.

Step S302: the receiving end determining, on the basis of a second mapping relationship between BPL identifiers and receiving beams, a first receiving beam corresponding to the first BPL identifier, where the transmitting end is provided with a first mapping relationship between the BPL identifiers and transmitting beams.

Step S303: the receiving end receiving a signal transmitted by the transmitting end by using the first receiving beam.

Optionally, for the above-mentioned method for determining beam information provided by the embodiments of the present application, the first mapping relationship specifically comprises a mapping relationship among the BPL identifiers, Channel State Information-Reference Signal Resource Indicators (CRIs), and the transmitting beams;

the second mapping relationship specifically comprises a mapping relationship among the BPL identifiers, the CRIs and the receiving beams.

Optionally, the above-mentioned method for determining beam information provided by the embodiments of the present application further includes:

receiving by the receiving end the mapping relationship between the BPL identifiers and the CRIs transmitted by the transmitting end.

Optionally, for the above-mentioned method for determining beam information provided by the embodiments of the present application, the receiving end determines the second mapping relationship by the following manner:

receiving by the receiving end configuration information of reference signal resources transmitted by the transmitting end;

receiving by the receiving end a reference signal transmitted by the transmitting end within reference signal resources, determining a receiving beam corresponding to each reference signal resource, and determining a mapping relationship between the CRIs and the receiving beams; and determining by the receiving end, on the basis of the mapping relationship between the CRIs and the receiving beams and the mapping relationship between the BPL identifiers and the CRIs, the second mapping relationship.

Subsequently, if the updating of the mapping relationship between the BPL identifiers and the CRIs is involved, the receiving end may further include the step of receiving the updated mapping relationship between the BPL identifiers and the CRIs transmitted by the transmitting end, and updating the mapping relationship between the BPL identifiers and the CRIs in the receiving end by using the updated mapping relationship between the BPL identifiers and the CRIs.

Corresponding to the above-mentioned method, the embodiments of the present application also provide a following device.

Figure 4:
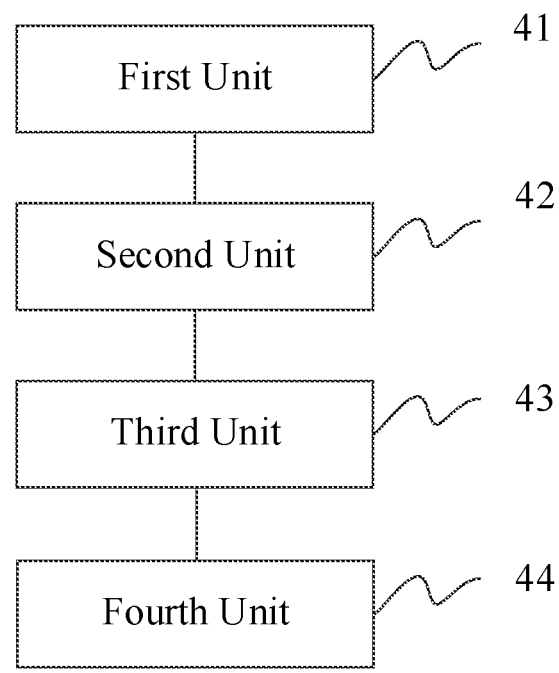
FIG. 4 is a structural schematic diagram of a device for indicating beam information provided by embodiments of the present application.

Referring to FIG. 4, at a transmitting end, the embodiments of the present application provide a device for indicating beam information, which includes:

a first unit 41 for determining a first transmitting beam to be used for transmission with a receiving end;

a second unit 42 for determining, on the basis of a first mapping relationship between beam pair link (BPL) identifiers and transmitting beams, a first BPL identifier corresponding to the first transmitting beam, where the receiving end is provided with a second mapping relationship between the BPL identifiers and receiving beams;

a third unit 43 for transmitting the first BPL identifier to the receiving end; and a fourth unit 44 for transmitting a signal to the receiving end by using the first transmitting beam.

Optionally, the first mapping relationship specifically comprises a mapping relationship among the BPL identifiers, Channel State Information-Reference Signal Resource Indicators (CRIs), and the transmitting beams;

the second mapping relationship specifically comprises a mapping relationship among the BPL identifiers, the CRIs and the receiving beams.

Optionally, the second unit 42 determines the first mapping relationship by the following manner:

configuring reference signal resources for the receiving end;

transmitting a reference signal within the reference signal resources to the receiving end, so that the receiving end performs measurement and reporting for the reference signal; and determining the first mapping relationship from measurement reporting results reported by the receiving end.

Optionally, the third unit 43 is further used for:
transmitting a mapping relationship between the BPL identifiers and the CRIs to the receiving end.

Figure 5:
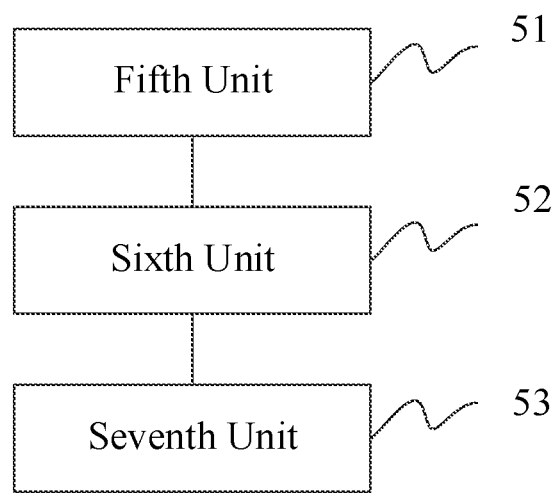
FIG. 5 is a structural schematic diagram of a device for determining beam information provided by embodiments of the present application.

Referring to FIG. 5, at a receiving end, the embodiments of the present application provide a device for determining beam information, which includes:
a fifth unit 51 for receiving a first beam pair link (BPL) identifier indicated by a transmitting end;
a sixth unit 52 for determining, on the basis of a second mapping relationship between BPL identifiers and receiving beams, a first receiving beam corresponding to the first BPL identifier, wherein the transmitting end is provided with a first mapping relationship between the BPL identifiers and transmitting beams; and
a seventh unit 53 for receiving a signal transmitted by the transmitting end by using the first receiving beam.

Optionally, the first mapping relationship specifically comprises a mapping relationship among the BPL identifiers, Channel State Information-Reference Signal Resource Indicators (CRIs), and the transmitting beams;
the second mapping relationship specifically comprises a mapping relationship among the BPL identifiers, the CRIs and the receiving beams.

Optionally, the sixth unit is further used for:
receiving the mapping relationship between the BPL identifiers and the CRIs transmitted by the transmitting end.

Optionally, the sixth unit determines the second mapping relationship by the following manner:
receiving configuration information of reference signal resources transmitted by the transmitting end;
receiving a reference signal transmitted by the transmitting end within the reference signal resources, determining a receiving beam corresponding to each reference signal resource, and determining the mapping relationship between the CRIs and the receiving beams; and
determining, on the basis of the mapping relationship between the CRIs and the receiving beams and the mapping relationship between the BPL identifiers and the CRIs, the second mapping relationship.

Figure 6:
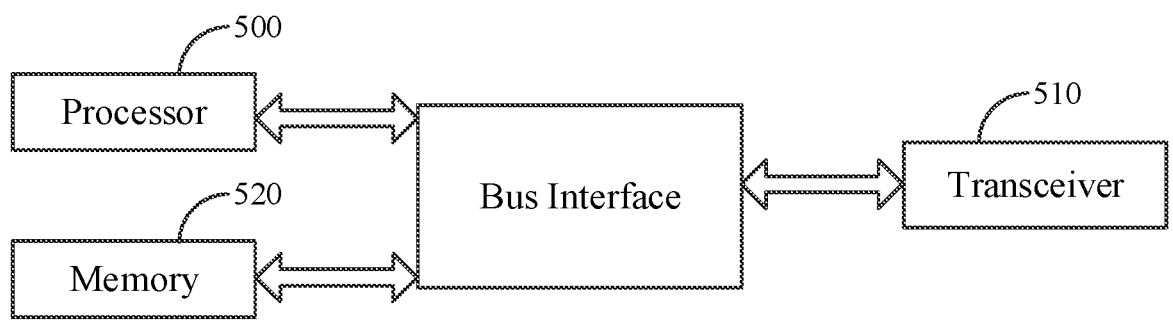
FIG. 6 is a structural schematic diagram of another device for indicating beam information provided by embodiments of the present application.

Referring to FIG. 6, at a transmitting end, the embodiments of the present application provide another device for indicating beam information, which includes:
a processor 500 used for reading programs in a memory 520 and executing the following process:
determining a first transmitting beam to be used for transmission with a receiving end;
determining, on the basis of a first mapping relationship between beam pair link (BPL) identifiers and transmitting beams, a first BPL identifier corresponding to the first transmitting beam, where the receiving end is provided with a second mapping relationship between the BPL identifiers and receiving beams;
transmitting the first BPL identifier to the receiving end through a transceiver 510; and
transmitting a signal to the receiving end by using the first transmitting beam through the transceiver 510.

Optionally, the first mapping relationship specifically comprises a mapping relationship among the BPL identifiers, Channel State Information-Reference Signal Resource Indicators (CRIs), and the transmitting beams;
the second mapping relationship specifically comprises a mapping relationship among the BPL identifiers, the CRIs and the receiving beams.

Optionally, the processor 500 determines the first mapping relationship by the following manner:

configuring reference signal resources for the receiving end;
transmitting a reference signal within the reference signal resources to the receiving end, so that the receiving end performs measurement and reporting for the reference signal; and
determining the first mapping relationship from measurement reporting results reported by the receiving end.

Optionally, the processor 500 is further used for:
transmitting the mapping relationship between the BPL identifiers and the CRIs to the receiving end by the transceiver 510.

The transceiver 510 is used for receiving and transmitting data under the control of the processor 500.

In FIG. 6, bus architecture may include any number of interconnected buses and bridges, and specifically, various circuits of one or more processors represented by the processor 500 and a memory represented by the memory 520 are linked together. The bus architecture can also link together various other circuits such as peripheral devices, voltage regulators and power management circuits, which are all well known in the art, and therefore will not be further described herein. A bus interface provides an interface. The transceiver 510 may be multiple elements, i.e., including a transmitter and a receiver, so as to provide a unit for communicating with various other devices over a transmission medium. The processor 500 is responsible for managing the bus architecture and general processing, and the memory 520 can store data used by the processor 500 when the processor 500 performs operations.

The processor 500 may be a Central Processing Unit (CPU), an Application Specific Integrated Circuit (ASIC), a Field-Programmable Gate Array (FPGA), or a Complex Programmable Logic Device (CPLD).

Figure 7:
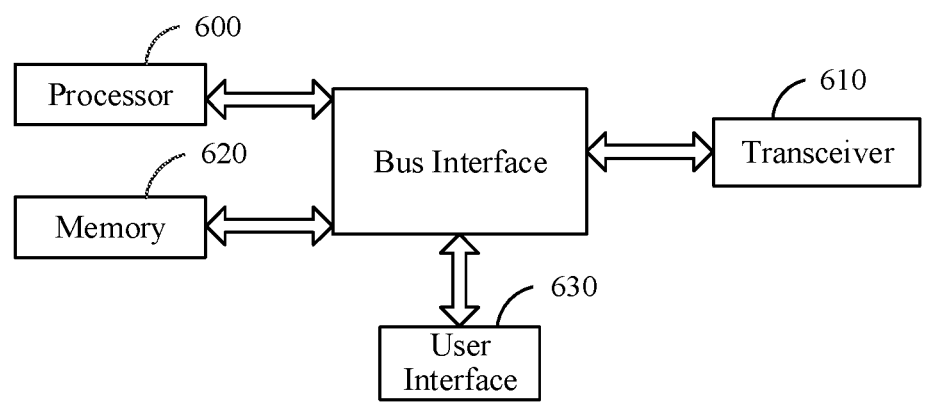
FIG. 7 is a structural schematic diagram of another device for determining beam information provided by embodiments of the present application.

Referring to FIG. 7, at a receiving end, the embodiments of the present application provide another device for determining beam information, which includes:
a processor 600 used for reading programs in a memory 620 and executing the following process:
receiving a first beam pair link (BPL) identifier indicated by a transmitting end through a transceiver 610;
determining, on the basis of a second mapping relationship between BPL identifiers and receiving beams, a first receiving beam corresponding to the first BPL identifier, where the transmitting end is provided with a first mapping relationship between the BPL identifiers and transmitting beams; and
receiving a signal transmitted by the transmitting end by using the first receiving beam through the transceiver 610.

Optionally, the first mapping relationship specifically includes a mapping relationship among the BPL identifiers, Channel State Information-Reference Signal Resource Indicators (CRIs), and the transmitting beams; and
the second mapping relationship specifically includes a mapping relationship among the BPL identifiers, the CRIs and the receiving beams.

Optionally, the processor 600 further includes:
receiving the mapping relationship between the BPL identifiers and the CRIs transmitted by the transmitting end through the transceiver 610.

Optionally, the processor 600 determines the second mapping relationship by the following manner:
receiving configuration information of reference signal resources transmitted by the transmitting end through the transceiver 610;

receiving by the transceiver 610 a reference signal transmitted by the transmitting end within reference signal resources, determining by the transceiver 610 a receiving beam corresponding to each reference signal resource, and determining the mapping relationship between the CRIs and the receiving beams by the transceiver 610; and determining, on the basis of the mapping relationship between the CRIs and the receiving beams and the mapping relationship between the BPL identifiers and the CRIs, the second mapping relationship.

The transceiver 610 is used for receiving and transmitting data under the control of the processor 600.

In FIG. 7, bus architecture may include any number of interconnected buses and bridges, and specifically various circuits of one or more processors represented by the processor 600 and a memory represented by the memory 620 are linked together. The bus architecture can also link together various other circuits such as peripheral devices, voltage regulators, and power management circuits, which are all well known in the art, and therefore will not be further described herein. A bus interface provides an interface. The transceiver 610 may be multiple elements, i.e., including a transmitter and a receiver, so as to provide a unit for communicating with various other devices over a transmission medium. For different user devices, a user interface 630 may also be an interface capable of externally and internally connecting required devices, and the connected devices include, but are not limited to, a keypad, a display, a speaker, a microphone, a joystick, etc.

The processor 600 is responsible for managing the bus architecture and general processing, and the memory 620 can store data used by the processor 600 when the processor 600 performs operations.

Optionally, the processor 600 may be a Central Processing Unit (CPU), an Application Specific Integrated Circuit (ASIC), a Field-Programmable Gate Array (FPGA), or a Complex Programmable Logic Device (CPLD).

Correspondingly, the embodiments of the present application further provide a communication system, which includes the above-mentioned device for indicating beam information provided by the embodiments of the present application, and/or the above-mentioned device for determining beam information provided by the embodiments of the present application. That is, the communication system (or also referred to as a communication device) provided by the embodiments of the present application may have all or part of the functions of the above-mentioned device for indicating beam information or the above-mentioned device for determining beam information.

Based on the same technical concept, the embodiments of the present application also provide a computer storage medium. The computer storage medium is a non-volatile storage medium, and stores computer-executable instructions for causing a computer to execute the flow of processing beam information as described in the previous embodiments.

In conclusion, in the above solutions provided by the embodiments of the present application, by building the first mapping relationship between the BPL identifiers and the transmitting beams at the transmitting end and correspondingly building the second mapping relationship between the BPL identifiers and the receiving beams at the receiving end, the indication of beam information only needs to be used to indicate the BPL identifiers, so that the receiving end can determine the corresponding receiving beams according to the BPL identifiers, thereby reducing the system overhead during the process of indicating beam information.

Those skilled in the art should appreciate that the embodiments of the present application may provide methods, systems, or computer program products. Therefore, the present application can adopt the form of an entirely hardware embodiment, an entirely software embodiment, or an embodiment combining software and hardware. Furthermore, the present application can adopt the form of a computer program product implemented on one or more computer-usable storage media (including, but not limited to, a magnetic disk memory, an optical memory, etc.) containing computer-usable program codes therein.

The present application is described with reference to flowcharts and/or block diagrams of methods, devices (systems), and computer program products according to the embodiments of the present application. It should be understood that each flow and/or block in the flowcharts and/or block diagrams, and combinations of flows and/or blocks in the flowcharts and/or block diagrams, can be implemented by computer program instructions. The computer program instructions may be provided to a processor of a general purpose computer, a special purpose computer, an embedded processor, or other programmable data processing devices to produce a machine, so that the instructions executed by the processor of the computer or other programmable data processing devices produce devices for implementing the functions specified in the flow or flows of the flowcharts and/or in the block or blocks of the block diagrams.

The computer program instructions may also be stored in a computer-readable memory that can direct the computer or other programmable data processing devices to function in a particular manner, so that the instructions stored in the computer-readable memory produce a product including instruction devices that implement the functions specified in the flow or flows of the flowcharts and/or in the block or blocks of the block diagrams.

The computer program instructions may also be loaded onto a computer or other programmable data processing devices, so that a series of operational steps are performed on the computer or other programmable devices to produce a computer-implemented process, and thus the instructions that are executed on the computer or other programmable devices provide steps for implementing the functions specified in the flow or flows of the flowcharts and/or in the block or blocks of the block diagrams.

Obviously, those skilled in the art can make various changes and modifications to the present application without departing from the spirit and scope of the present application. Therefore, if the modifications and variations of the present application fall within the scope of the claims of the present application and their equivalent technologies, the present application is also intended to include the modifications and variations.

The invention claimed is:

1. A method for determining beam information, comprising:

receiving, by a receiving end, a first beam pair link (BPL) identifier indicated by a transmitting end;

determining, by the receiving end, on the basis of a second mapping relationship between BPL identifiers and receiving beams, a first receiving beam corresponding to the first BPL identifier, wherein the transmitting end is provided with a first mapping relationship between BPL identifiers and transmitting beams; and receiving, by the receiving end, a signal transmitted by the transmitting end by using the first receiving beam;

wherein the first mapping relationship comprises a mapping relationship among the BPL identifiers, Channel State Information-Reference Signal Resource Indicators (CRIs), and the transmitting beams; and the second mapping relationship comprises a mapping relationship among the BPL identifiers, CRIs and the receiving beams;

wherein the method for determining beam information further comprises:

receiving, by the receiving end, a mapping relationship between the BPL identifiers and the CRIs transmitted by the transmitting end; and wherein the receiving end determines the second mapping relationship by the following method:

receiving, by the receiving end, configuration information of reference signal resources transmitted by the transmitting end;

receiving, by the receiving end, a reference signal transmitted by the transmitting end within the reference signal resources, determining a receiving beam corresponding to each reference signal resource, and determining a mapping relationship between CRIs and receiving beams; and determining by the receiving end, on the basis of the mapping relationship between the CRIs and the receiving beams and the mapping relationship between the BPL identifiers and the CRIs, the second mapping relationship.

2. A device for determining beam information, comprising:

a memory for storing program instructions; and a processor for calling program instructions stored in the memory and executing following process according to an obtained program:

receiving a first beam pair link (BPL) identifier indicated by a transmitting end; determining, on the basis of a second mapping relationship between BPL identifiers and receiving beams, a first receiving beam corresponding to the first BPL identifier, wherein the transmitting end is provided with a first mapping relationship between BPL identifiers and transmitting beams; and receiving a signal transmitted by the transmitting end by using the first receiving beam;

wherein the first mapping relationship comprises a mapping relationship among the BPL identifiers, Channel State Information-Reference Signal Resource Indicators (CRIs), and the transmitting beams; and the second mapping relationship comprises a mapping relationship among the BPL identifiers, CRIs and the receiving beams;

wherein the processor is further used for:

receiving a mapping relationship between the BPL identifiers and the CRIs transmitted by the transmitting end;

wherein the processor is further used for determining the second mapping relationship by the following method:

receiving configuration information of reference signal resources transmitted by the transmitting end;

receiving a reference signal transmitted by the transmitting end within the reference signal resources, determining a receiving beam corresponding to each reference signal resource, and determining a mapping relationship between CRIs and receiving beams; and determining, on the basis of the mapping relationship between the CRIs and the receiving beams and the mapping relationship between the BPL identifiers and the CRIs, the second mapping relationship.

3. A non-transitory computer storage medium, wherein the non-transitory computer storage medium stores computer-executable instructions for causing a computer to perform the method of claim 1.

4. A system for indicating beam information, comprising a transmitting device, and a receiving device, wherein:

the transmitting device is provide with a first mapping relationship, and configured to:

determine a first transmitting beam to be used for transmission with the receiving device;

determine, on the basis of the first mapping relationship between beam pair link (BPL) identifiers and transmitting beams, a first BPL identifier corresponding to the first transmitting beam;

transmit the first BPL identifier to the receiving device; and transmit a signal to the receiving device by using the first transmitting beam;

wherein the receiving device is provided with a second mapping relationship, and configured to:

receive the first beam pair link (BPL) identifier indicated by the transmitting device;

determine, on the basis of the second mapping relationship between the BPL identifiers and receiving beams, a first receiving beam corresponding to the first BPL identifier; and receive the signal transmitted by the transmitting device by using the first receiving beam;

wherein the first mapping relationship comprises a mapping relationship among the BPL identifiers, Channel State Information-Reference Signal Resource Indicators (CRIs), and the transmitting beams; and the second mapping relationship comprises a mapping relationship among the BPL identifiers, CRIs and the receiving beams;

wherein the transmitting device provided with the first mapping relationship, is further configured to:

configure reference signal resources for the receiving device;

transmit a reference signal within the reference signal resources to the receiving end; and transmit a mapping relationship between the BPL identifiers and the CRIs to the receiving device; and wherein the receiving device provided with the second mapping relationship is further configured to:

receive the mapping relationship between the BPL identifiers and the CRIs transmitted by the transmitting device; and determines the second mapping relationship by:

receiving configuration information of the reference signal resources transmitted by the transmitting device;

receiving the reference signal transmitted by the transmitting device within the reference signal resources, determining a receiving beam corresponding to each reference signal resource, and determining a mapping relationship between CRIs and receiving beams; and determining, on the basis of the mapping relationship between the CRIs and the receiving beams and the mapping relationship between the BPL identifiers and the CRIs, the second mapping relationship.

* * * * *